No. 772,776. PATENTED OCT. 18, 1904.
O. BERGER.
INSECTICIDE APPARATUS.
APPLICATION FILED APR. 30, 1904.
NO MODEL.

WITNESSES:
Jos. A. Ryan
Amos W. Hart

INVENTOR
Otto Berger
BY
ATTORNEYS

No. 772,776.

Patented October 18, 1904.

UNITED STATES PATENT OFFICE.

OTTO BERGER, OF GALVESTON, TEXAS.

INSECTICIDE APPARATUS.

SPECIFICATION forming part of Letters Patent No. 772,776, dated October 18, 1904.

Application filed April 30, 1904. Serial No. 205,733. (No model.)

*To all whom it may concern:*

Be it known that I, OTTO BERGER, a citizen of the United States, and a resident of Galveston, in the county of Galveston and State of Texas, have made an Improved Insecticide Apparatus, of which the following is a specification.

My invention relates particularly to means applicable for preventing the ravages of the boll-weevil or insect which infests the cotton-plant and which has proved so destructive thereto; but the said method and means may be applied also to prevent the injury of vegetable growths by other forms of insects and also by diseases.

In carrying out my invention I employ a composition which is harmful or destructive to the boll-weevil or other injurious insect, and I inclose the same in a tube having lateral perforations and adapted to be inserted in the body or root of a plant.

The details of the invention are as hereinafter described, reference being had to the accompanying drawings, in which—

Figure 1:
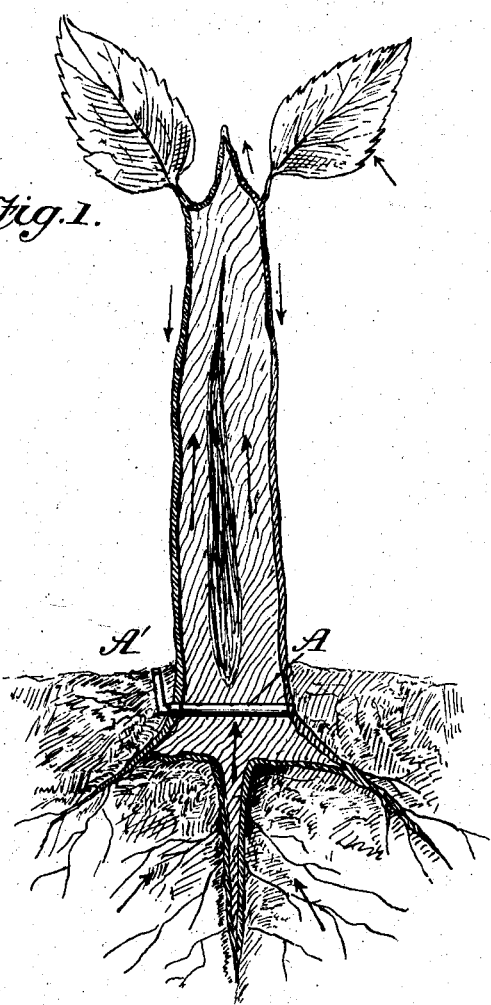
Figure 2:
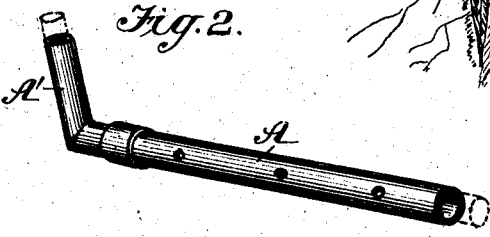
Figure 3:
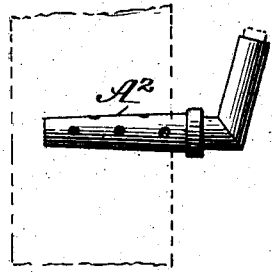

Figure 1 is a side view of a tree to which the insecticide is applied. Fig. 2 is a perspective view of one form of tube which I employ for holding the composition constituting the insecticide proper. Fig. 3 is a view illustrating the application to the body of a tree of a tube of different form.

In Figs. 1 and 2, A indicates a cylindrical tube having a series of lateral perforations and a detachable end portion A', which is arranged at an angle to the body of the main tube A. The detachable tube A' is formed at an obtuse angle and its upward-projecting portion is normally closed by means of a cork or other form of stopper. Its horizontal portion is adapted to be inserted in the tube A or in a sleeve which joins the two parts. The opposite end of the said tube A may be also provided with a stopper, as shown in Fig. 2. The angle-tube A' serves as a receptacle and feeder for the composition with which the tube A is to be charged. In practice the said tube may have a tapered end, and the said end may be closed. When the tube has been duly charged, it is inserted in a bore in the body or stem of the tree, as shown in Fig. 1. It may thus pass entirely or part way through the said body. Instead of being thus located the tube may be inserted in the main or tap root of the tree. In the course of its natural circulation the sap of the tree passes through the perforations in the tube A and takes up more or less of the poisonous substance and conveys it on to the branches and leaves, where it is absorbed, exhaled, and destroys the larvæ of the boll-weevil or the weevil itself or prevents the same depositing its eggs in the natural course.

I show in Fig. 3 a modified form of tube $A^2$, the same being tapered, so that it is adapted to be more easily inserted in the stem or root of the plant or tree. It may be provided with a supplemental charging-tube, as indicated.

Any preferred composition which is injurious or destructive to the boll-weevil or other insect may be employed for charging the perforated tube. The composition which I preferably employ is composed of sulfid of potassium, camphor, carbolic acid, oil pennyroyal, oil of mustard, and nitrite amyl, each one part, and bisulfid of carbon, eight parts. These proportions are by weight.

In practice wax or some other adhesive protective substance requires to be applied around the tube where it projects from the stem or root of the plant, so that no sap will exude at that point of the plant, while air is excluded.

It will be understood that the tube charged with the composition described may be inserted at an inclination to the axis of the tree trunk or stem instead of horizontally, as shown.

What I claim is—

The improved device for applying an insecticide composition to the cotton-plant or other vegetable growth, which consists of a tube having lateral perforations and a charging-tube attached thereto and arranged at an angle to such perforated tube, both tubes being provided with stoppers at their open free ends, as shown and described.

OTTO BERGER.

Witnesses:
 GEO. W. ENGLAND,
 JAS. B. KING.